2,865,922
3,5-DIKETO-PYRAZOLIDINES

Ernst Jucker and Arnold Vogel, Binningen, and Erwin Rissi, Basel, Switzerland, assignors to Sandoz A. G., Basel, Switzerland, a Swiss firm No Drawing. Application January 2, 1957
Serial No. 632,022

Claims priority, application Switzerland January 7, 1956

10 Claims. (Cl. 260—294.7)

The present invention provides new and therapeutically valuable 3,5-diketo-pyrazolidine derivatives.

The 3,5-diketo-pyrazolidine derivatives according to the present invention correspond to the formula

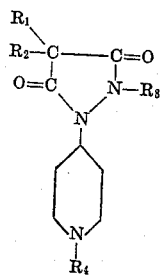

wherein each of $R_1$ and $R_2$ is an aliphatic group (e. g. alkyl such as methyl, ethyl, n-butyl, etc.) or an aromatic group (e. g. phenyl, substituted phenyl, benzyl, etc.), $R_3$ is H or alkyl with 1 to 4 carbon atoms (e. g. methyl, ethyl, propyl, isopropyl, n-butyl, isobutyl, etc.), and $R_4$ also is alkyl with 1 to 4 carbon atoms.

The aforesaid 3,5-diketo-pyrazolidine derivatives of Formula I are prepared, according to this invention, by reacting a piperidyl-4'-hydrazine of the formula

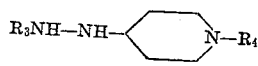

wherein $R_3$ and $R_4$ have the precedingly-indicated significances with a reactive derivative of malonic acid, which derivative corresponds to the formula

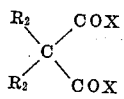

wherein $R_1$ and $R_2$ also have their precedingly-indicated significances, and X is Br, Cl, $N_3$, O-alkyl or $NH_2$. Thus, for example, to a solution of diphenyl-malonyl dichloride in an inert solvent such as tetrahydrofurane or chloroform, there is added at room temperature (about 20° to about 30° C.) first a solution of compound II, e. g. N-methyl-piperidyl-4'-hydrazine, in the same solvent and then a tertiary base, such e. g. as triethylamine. The resultant reaction product is recovered in any one of a number of ways: for example, by evaporating off the solvent, dissolving the residue in a chlorinated hydrocarbon, removing all acid by-products from the solution by washing e. g. with sodium carbonate solution, evaporating the organic layer which has formed, and purifying the obtained residue by recrystallization. The tertiary amine may be dispensed with, if desired.

The piperidyl-4-hydrazines can also be prepared in a number of ways, details of which are set forth in the illustrative examples which follow. For example, an N-alkyl-4-piperidone of the formula

wherein $R_4$ is as precedingly defined can be condensed with an alkyl hydrazine of the formula $$R_3-NH-NH_2 \quad (V)$$

wherein $R_3$ also has its precedingly-indicated significance, to produce the corresponding N-alkyl-piperidyl-4-alkyl-hydrazone which, upon reduction with hydrogen, yields the corresponding ω-(N-alkyl-piperidyl-4)-ω'-alkyl-hydrazine. The N-alkyl-piperidyl-4-alkyl-hydrazone may be acylated prior to the reduction, and the desired hydrazine derivative obtained by splitting off the acyl group by saponification. The condensation of an N-alkyl-4-piperidone (IV) with an acyl derivative of hydrazine itself produces the corresponding N-alkyl-4-piperidone-acyl derivative which, upon hydrogenation, yields the corresponding hydrazine derivative, from which the acyl group may also be saponified off. It is also possible to proceed by reacting an N-alkyl-4-halogen-piperidine with a hydrazine of Formula V.

The products obtained according to the present invention, i. e. the new 3,5-diketo-pyrazolidine derivatives are, at room temperature, solid crystalline bases which form stable physiologically tolerable salts with a wide variety of organic and inorganic acids, e. g. the acetates, hydrochlorides, hydrobromides, sulfates, citrates, benzoates, tartrates, methane sulfonates, etc.

The new products of this invention possess pharmacodynamic properties which make them useful medicaments. They have antipyretic and analgetic action, but are particularly characterized by their strong antiphlogistic action. They are distinguished by good local tolerability and low toxicity. They may be administered intramuscularly, perorally or in suppository form. The good solubility of their salts makes possible the preparation of highly-concentrated ampoule solutions.

The diketo-pyrazolidines of this invention are thus especially suitable for treating chronic rheumatism, chronic rheumatic polyarthritis and other arthritic conditions.

The following examples set forth presently preferred representative embodiments of the invention. In these examples, the parts and percentages are by weight unless otherwise indicated. The relation between parts by weight and parts by volume is as that between grams and milliliters. The temperatures are in degrees centigrade.

Example 1

22.6 parts of N-methyl-4-piperidone are added to a solution of 27.2 parts of benzoylhydrazine in 400 parts by volume of ethanol, and the mixture is boiled under reflux for 2 hours with stirring. The reaction mixture is evaporated to dryness under reduced pressure, and the residue is recrystallized from benzene-ether, yielding the benzoylhydrazone of N-methyl-4-piperidone; melting point 146–147°.

A solution of 34.6 parts of the thus-prepared benzoyl-hydrazone in 275 parts by volume of glacial acetic acid is hydrogenated in the presence of 0.4 part of platinum oxide catalyst at room temperature and at atmospheric pressure. At the end of four and a half hours, the theoretical quantity of hydrogen has been taken up, whereupon the solution is separated from the catalyst by filtration and is then evaporated to dryness under reduced pressure. The residue from this evaporation is boiled under reflux for 4 hours in 250 parts by volume of aqueous hydrochloric acid of 23% strength, after which the solution is allowed to cool and then extracted with ether; the aqueous layer is then evaporated by dryness under reduced pressure. To the residue of this evaporation, there is added a solution of 27 parts of potassium hydroxide in 200 parts by volume of methanol, and the mixture is then heated on the water-bath until all oily substance is dissolved. Precipitated potassium chloride is filtered off, and the filtrate is evaporated to dryness under reduced pressure. The so-obtained residue is dissolved in boiling tetrahydrofurane, the solution filtered and the filtrate evaporated to dryness under reduced pressure, after which the obtained residue is fractionated in a high vacuum. The obtained N-methyl-piperidyl-4'-hydrazine boils at 66–70° under a pressure of 0.25–0.32 mm. Hg; it is a colorless crystalline substance.

A solution of 12.9 parts of the so-obtained N-methyl-piperidyl-4'-hydrazine in 40 parts by volume of tetrahydrofurane and then 20.2 parts of triethylamine are added dropwise to a solution of 29.2 parts of diphenyl-malonyl di-chloride in 100 parts by volume of tetrahydrofurane at room temperature (about 20° to about 30°), the resultant mixture is diluted with 80 parts by volume of chloroform and is then boiled under reflux for 3 hours while being stirred. Thereupon the solution is filtered and the filtrate then evaporated under reduced pressure. The residue is dissolved in methylene chloride and the solution is washed twice with 2-normal aqueous sodium carbonate solution, dried over sodium sulfate and then evaporated under reduced pressure. The resultant crystalline residue is fractionally recrystallized from ethanol, yielding pure 1-(N-methyl-piperidyl-4')-4,4-diphenyl-3,5-diketo-pyrazolidine, which has a melting point of 258–263°.

*Example 2*

A solution of 5.22 parts of N-methyl-piperidyl-4'-hydrazine and 11.2 parts by volume of triethylamine in 50 parts by volume of tetrahydrofurane is added dropwise to a solution of 7.96 parts of diethylmalonyl di-chloride in 150 parts by volume of tetrahydrofurane at room temperature. An additional 11.2 parts by volume of triethylamine are then added, and the mixture stirred for 4½ hours at room temperature. The salts which precipitate are then filtered off and the filtrate is evaporated to dryness under reduced pressure. The so-obtained residue is dissolved in 150 parts by volume of methylene chloride, and the resultant solution is washed twice with 2-normal aqueous sodium carbonate solution, dried over sodium sulfate and then evaporated under reduced pressure. The obtained oily residue is dissolved in 50 parts by volume of benzene, and the solution is poured onto a column of 235 parts of aluminum oxide and then, using mixtures of ether and ethanol, first in the proportion of 9:1, then 4:1, and finally 1:1, there is eluted a crystalline substance —1-(N-methyl-piperidyl-4')-3,5-diketo-4,4-diethyl-pyrazolidine— which after three recrystallizations from acetone, melts at 188–189°.

*Example 3*

8.0 parts of methylhydrazine, dissolved in 10 parts by volume of absolute ethanol, are added dropwise to a solution of 19.2 parts of N-methyl-4-piperidone, the temperature being maintained at between 20 and 30°, if necessary with the aid of a mixture of ice and salt. The mixture is then heated to 60–65° for 40 minutes. After the addition of 25 parts of benzene, the water which formed is azeotropically distilled off with the alcohol, and the solution evaporated at 80° under reduced pressure. The obtained residue is then distilled under reduced pressure. (N-methyl-4-piperidone)-methyl-hydrazone distils over at 98–99° under a pressure of 11 mm. Hg.

10 parts of benzoyl chloride, dissolved in 25 parts by volume of chloroform, are added dropwise to a solution of 10.0 parts of (N-methyl-4-piperidone)-methyl-hydrazone in 30 parts by volume of chloroform, the temperature being maintained at a maximum of 10° by cooling with an ice-salt mixture. The solution is then allowed to stand at room temperature (about 20–30°) for 12 hours, and is then evaporated. The so-obtained resinous residue is dissolved in 20 parts by volume of water, 20 parts by volume of aqueous caustic soda solution of 10% strength are added, and the resultant solution extracted with chloroform. The chloroform solution, dried over sodium sulfate, is evaporated, leaving behind a viscous yellow oil, which crystallizes when rubbed. The product—(N-methyl - 4 - piperidone)-methyl-benzoyl-hydrazone—crystallizes from acetone in the form of parallelopipeds which melt at 96–103°; boiling point is 145–150°/0.1 mm. Hg.

A solution of 4.0 parts of (N-methyl-4-piperidone)-methyl-benzoylhydrazone in 70 parts by volume of glacial acetic acid is added to a slurry of 0.80 part of pre-hydrogenated platinum oxide in 10 parts by volume of glacial acetic acid, and the mixture then hydrogenated at room temperature and under atmospheric pressure, whereupon the quantity of hydrogen required for the C=N double bond will be taken up within 3 hours. The solution is separated from the catalyst by filtration and is then evaporated at 60° under reduced pressure, the residue being then dissolved in 10 parts by volume of ice water. After the addition of 15 parts by volume of aqueous caustic soda solution of 20% strength and saturation with sodium chloride, the resultant mixture is extracted with chloroform. The chloroform extract is dried over sodium sulfate and is then evaporated. The so-obtained residue yields, upon distillation in a high vacuum, ω-(N-methyl-piperidyl-4)-ω'-methyl-benzoyl hydrazine (which boils at 145–150°/0.3 mm. Hg), and which upon recrystallization from ether-petroleum ether is obtained in the form of platelets and needles which melt at 70–76°.

However, in order to prepare the hydrazine derivative itself by splitting off the benzoyl group from the benzoyl derivative, it is not necessary to prepare the latter in the pure state, but the crude hydrogenation product obtained after the evaporation of the glacial acetic acid may be directly worked up further.

800 parts by volume of aqueous hydrochloric acid of 23% strength are added to the crude ω-(N-methyl-piperidyl-4)-ω'-methyl-benzoyl-hydrazine obtained from the hydrogenation of 55.5 parts of benzoyl-hydrazone after evaporating off the glacial acetic acid, and the mixture is boiled under reflux for 5 hours. The resultant solution, cooled to −5°, is filtered from the precipitated benzoic acid and is evaporated to dryness at 80° under a pressure of 12 mm. Hg. The residue, upon recrystallization from methanol-ether, yields ω-(N-methyl-piperidyl-4)-ω'-methyl-hydrazine dihydrochloride in the form of colorless fine needles which, after being dried over phosphorus pentoxide at 50° in a high vacuum, melt at 187–210° with evolution of hydrogen chloride. The dihydrochloride, upon being treated with methanolic potassium hydroxide solution, yields the free ω-(N-methyl-piperidyl-4)-ω'-methyl-hydrazine as a water-clear colorless liquid which boils at 60°/0.3 mm. Hg; $n_D^{22}=1.4835$.

A solution of 1.43 parts of the so-obtained ω-(N-methyl-piperidyl-4)-ω'-methyl-hydrazine in 15 parts by volume of tetrahydrofurane are added dropwise to a solution, preliminarily cooled to 0°, of 2.93 parts of diphenyl-malonyl dichloride in 40 parts by volume of tetrahydrofurane, with stirring and further cooling with ice. The obtained mixture is then boiled under reflux for 2 hours. After cooling, the reaction mixture is diluted with ether and then extracted three times with 2-normal aqueous hydrochloric acid. The hydrochloric acid aqueous layer is rendered alkaline with concentrated aqueous caustic soda solution, and then extracted three times with methylene chloride. The obtained organic layer is dried over sodium sulfate and is evaporated, leaving as residue an oil. The latter is dissolved in benzene, and the obtained solution is chromatographed on 90 parts of aluminum oxide. Upon development of the chromatogram with benzene, benzene-ether mixtures in the proportion first of 4:1 and then of 1:1, and finally with ether alone, there is eluted the 1-(N-methyl-piperidyl-4')-2-methyl-4,4-diphenyl-3,5-diketo-pyrazolidine which, upon recrystallization from ether-petroleum ether, has a melting point of 112–113°.

Example 4

1-(N-methyl-piperidyl-4')-2-methyl-4,4-di-n-butyl-3,5-diketo-pyrazolidine is prepared, after the manner set forth in the preceding example, from 2.53 parts of di-n-butyl-malonyl-dichloride and 1.43 parts of ω-(N-methyl-piperidyl-4)-ω'-methyl-hydrazine in the presence of 2.8 parts by volume of triethylamine. The so-prepared 1-(N-methyl-piperidyl-4')-2-methyl-4,4-di-n-butyl-3,5-diketo-pyrazolidine can not be crystallized, after the chromatography, but is obtained as an oily substance. By passing dry hydrogen chloride into a solution of the latter in absolute ethanol, the monohydrochloride of the base is obtained in the form of crystals which, upon recrystallization from acetone-ether, have a melting point of 200–202°.

Example 5

A solution of 1.43 parts of ω-(N-methyl-piperidyl-4)-ω'-methyl-hydrazine in 15 parts by volume of tetrahydrofurane and then 2.02 parts of triethylamine are added dropwise and while cooling with ice to a solution of 1.97 parts of diethylmalonyl dichloride in 50 parts by volume of tetrahydrofurane, after which the mixture is boiled under reflux for 4 hours with stirring. After being allowed to cool, the reaction mixture is diluted with ether and then is extracted 3 times with 2-normal hydrochloric acid. The hydrochloric acid aqueous layer is then rendered alkaline with concentrated aqueous caustic soda solution and is then extracted three times with chloroform. The chloroform solution is dried over sodium sulfate and then is evaporated under reduced pressure, leaving behind a crude oily product. The latter is dissolved in 50 parts by volume of benzene, and the solution is poured onto a column of a 30-fold quantity of aluminum oxide. Elution with benzene and with benzene-ether mixtures, 4:1 and 1:1, yields 1-(N-methyl-piperidyl-4')-2-methyl-4,4-diethyl-3,5-diketopyrazolidine.

The corresponding hydrochloride is prepared by passing dry hydrogen chloride into an ethanolic solution of the free base, 1-(N-methyl-piperidyl-4')-2-methyl-4,4-diethyl-3,5-diketo-pyrazolidine, concentrating the resultant solution, and then adding ether thereto, whereupon 1-(N-methyl-piperidyl-4')-2-methyl-4,4-diethyl-3,5-diketo-pyrazolidine hydrochloride crystallizes out. After recrystallization from ethanol-ether, it melts at 220–221° (decomposition).

Example 6

A solution of 1.43 parts of ω-(N-methyl-piperidyl-4)-ω'-methyl-hydrazine in 15 parts by volume of tetrahydrofurane and then 2.02 parts of triethylamine are added dropwise and with cooling by ice to a solution of 1.69 parts of dimethylmalonyl dichloride in 50 parts by volume of tetrahydrofurane, after which the mixture is boiled under reflux for 4 hours with stirring. After the mixture has cooled, it is diluted with ether, and then extracted three times with 2-normal hydrochloric acid. The hydrochloric acid aqueous layer is made alkaline with concentrated aqueous sodium hydroxide solution, and then extracted 3 times with chloroform. The chloroform solution is dried over sodium sulfate and evaporated under reduced pressure, leaving behind an oily crude product, the solution of which in 50 parts by volume of benzene is then poured onto a column of the 30-fold quantity of aluminum oxide. Benzene, as well as benzene-ether mixtures, 4:1 and 1:1, elute the 1-(N-methyl-piperidyl-4')-2-methyl-4,4-dimethyl-3,5-diketo-pyrazolidine. The so-obtained free base is crystalline; however, it cannot be recrystallized.

The corresponding hydrochloride is prepared by passing dry hydrogen chloride into an ethanolic solution of the free base, concentrating the solution and then adding ether, whereupon the 1-(N-methyl-piperidyl-4')-2-methyl-4,4-dimethyl-3,5-diketo-pyrazolidine hydrochloride crystallizes out. After recrystallization from ethanol-ether, it melts at 261–262° (decomposition).

Example 7

86.5 parts of isopropyl-hydrazine, dissolved in 75 parts by volume of ethanol, are added dropwise to a solution of 131.7 parts of N-methyl-4-piperidone in 75 parts by volume of ethanol, the temperature being maintained at −15° to −5° by cooling. The resultant mixture is then heated to 60–80° for 30 minutes. After the addition of 200 parts by volume of benzene, water which has formed is distilled off together with the ethanol and the benzene under reduced pressure, and the residue is fractionated under reduced pressure.

The fraction which goes over at 86° to 115° under a pressure of 12 mm. Hg is again distilled. (N-methyl-4-piperidone)-isopropyl-hydrazone, which boils at 95–103° under a pressure of 8 mm. Hg, is thus obtained; $n_D^{22} = 1.4925$.

37.0 parts of benzoyl chloride, dissolved in 65 parts by volume of chloroform, are added dropwise at 10° to a solution of 44.5 parts of (N-methyl-4-piperidone)-isopropyl-hydrazine in 65 parts by volume of chloroform, the resultant solution is boiled under reflux for ¾ hour and then, after cooling the solution to 0°, ice-cold aqueous caustic soda solution of 6% strength is added. The solution is then extracted twice with chloroform, the chloroform extract washed with saturated aqueous sodium chloride solution, after which it is dried over sodium sulfate and evaporated. The so-obtained residue is fractionated in a high vacuum, whereupon (N-methyl-4-piperidone)-isopropyl-benzoyl-hydrazone passes over at 128° to 130° under a pressure of 0.003 mm. Hg.

Hydrogenation of 10.65 parts of the so-obtained benzoyl-hydrazone in 75 parts of glacial acetic acid in the presence of 0.2 part of pre-hydrogenated platinum oxide at room temperature and under atmospheric pressure produces ω-(N-methyl-piperidyl-4)-ω'-isopropyl-benzoyl-hydrazine, which is converted by boiling under reflux for 5 hours with aqueous hydrochloric acid of 23% strength, into ω-(N-methyl-piperidyl-4)-ω'-isopropyl-hydrazine (boiling point 49–54°/0.3 mm. Hg;

$$n_D^{24.5} = 1.4708)$$

A solution of 1.71 parts of the so-obtained ω-(N-methyl-piperidyl-4)-ω'-isopropyl-hydrazine in 15 parts by volume of tetrahydrofurane and 2.02 parts of triethylamine are added dropwise and while cooling with ice to a solution of 2.93 parts of diphenyl-malonyl di-chloride in 50 parts by volume of tetrahydrofurane, after which the mixture is boiled under reflux for 4 hours with stirring. Upon cooling of the mixture, it is diluted with ether and extracted three times with 2-normal aqueous hydrochloric acid. The hydrochloric acid aqueous layer is rendered alkaline with concentrated aqueous caustic soda solution and is then extracted three times with chloroform. The chloroform solution is dried over sodium sulfate and then evaporated under reduced pressure, leaving as residue an oily crude product, the solution of which in 50 parts by volume of benzene is poured onto a column of the 30-fold quantity of aluminum oxide. Benzene, and benzene-ether mixtures, 4:1 and 1:1, elute 1-(N-methyl-piperidyl-4')-2-isopropyl-4,4-diphenyl-3,5-diketo-pyrazolidine which, upon recrystallization from ether-petroleum ether, has a melting point of 124–125°.

In order to prepare the corresponding hydrochloride, dry hydrogen chloride is passed into an ethanolic solution of the free base, the resultant solution is then concentrated, after which ether is added, whereupon 1-(N-methyl-piperidyl-4')-2-isopropyl-4,4-diphenyl-3,5-diketo-pyrazolidine hydrochloride crystallizes out. After recrystallization from ethanol-ether, it melts at 247–252° (decomposition).

Example 8

In the same manner as that described in the preceding example, 1-(N-methyl-piperidyl-4')-2-isopropyl-4,4-di-n-butyl-3,5-diketo-pyrazolidine is prepared from 2.53 parts of di-n-butyl-malonyl dichloride and 1.71 parts of ω-(N-methyl-piperidyl-4)-ω'-isopropyl-hydrazine in the presence of 2.02 parts of triethylamine. The so-obtained pyrazolidine cannot be crystallized after the chromatography, but is obtained as an oily substance which dissolves in absolute ethanol. Passing dry hydrogen chloride into such ethanolic solution produces the monohydrochloride of the free base in the form of crystals which, after recrystallization from acetone-ether, melt at 234–236° (decomposition).

Example 9

In the same manner as that described in Example 7, 1-(N-methyl-piperidyl-4')-2-isopropyl-4,4-dimethyl-3,5-diketo-pyrazolidine is prepared from 1.69 parts of dimethyl-malonyl dichloride and 1.71 parts of ω-(N-methyl-piperidyl-4)-ω'-isopropyl-hydrazine in the presence of 2.02 parts of triethylamine. The so-obtained free base forms crystals without a solvent, which crystals are very readily soluble in organic solvents. A solution thereof in absolute ethanol yields, upon introduction thereinto of dry hydrogen chloride, crystals of the monohydrochloride of the base. Upon recrystallization of this hydrochloride from acetone-ether, it has a melting point of 261–262° (decomposition).

Example 10

37.7 parts of aqueous methyl-hydrazine solution of 39.5% strength are added dropwise, while cooling, to a solution of 45.0 parts of N-isopropyl-4-piperidone in 75 parts by volume of ethanol, and the mixture is kept at 65° for one hour. After evaporation of the ethanol and a portion of the water, the residue is dissolved in the 3-fold quantity of chloroform and is dried over sodium sulfate. After filtration and evaporating off the solvent under reduced pressure, the resultant residue is distilled in a high vacuum. There is thus obtained (N-isopropyl-4-piperidone)-methyl-hydrazone as a light yellow oil which boils at 78°/1 mm. Hg.

11.86 parts of this hydrazone are benzoylated in chloroform solution with 9.85 parts of benzoyl chloride, while cooling. (N-isopropyl-4-piperidone)-methyl-benzoyl-hydrazone which boils at 155–158° under a pressure of 0.002 mm. Hg is thus obtained.

4.79 parts of the last-mentioned benzoyl-hydrazone in 50 parts by volume of glacial acetic acid are hydrogenated in the presence of 0.1 part of pre-hydrogenated platinum oxide at room temperature and under atmospheric pressure, thereby producing ω-(N-isopropyl-piperidyl-4)-ω'-methyl-benzoyl-hydrazine. Hydrolysis of the latter by boiling under reflux for 5 hours with 75 parts by volume of aqueous hydrochloric acid of 23% strength yields ω-(N-isopropyl-piperidyl-4)-ω'-methyl-hydrazine dihydrochloride which, after four recrystallizations from ethanol-ether, melts at 247–253° with decomposition. The free base, with boiling point of 76°/0.3 mm. Hg is obtained from the dihydrochloride by treating the latter with methanolic KOH.

1.71 parts of the so-obtained ω-(N-isopropyl-piperidyl-4)-ω'-methyl-hydrazine dissolved in 15 parts by volume of tetrahydrofurane and then 2.02 parts of triethylamine are added dropwise, while cooling with ice, to a solution of 2.93 parts of diphenyl-malonyl dichloride in 50 parts by volume of tetrahydrofurane after which the mixture is boiled under reflux for 4 hours with stirring. The resultant mixture is then allowed to cool and after dilution with ether is extracted three times with 2-normal aqueous hydrochloric acid. The hydrochloric acid aqueous layer is rendered alkaline with concentrated aqueous caustic soda solution, and is then extracted three times with chloroform. The chloroform solution is dried over sodium sulfate and evaporated under reduced pressure, leaving behind an oily crude product. The latter is dissolved in 50 parts by volume of benzene and is added to a column of 100 parts of aluminum oxide. Benzene and benzene-ether mixtures 4:1 and 1:1 elute 1-(N-isopropyl-piperidyl-4')-2-methyl-4,4-diphenyl-3,5-diketo-pyrazolidine which, after recrystallization from ether-petroleum ether, has a melting point of 119–120°.

To prepare the corresponding hydrochloride, dry hydrogen chloride is passed into an ethanolic solution of the free base, after which the solution is concentrated and then diluted with ether, whereupon 1-(N-isopropyl-piperidyl-4')-2-methyl-4,4-diphenyl-3,5-diketo-pyrazolidine hydrochloride crystallizes out. After recrystallization from ethanol-ether, it melts at 235–239° (with decomposition).

Example 11

A solution of 1.71 parts of ω-(N-isopropyl-piperidyl-4)-ω'-methyl-hydrazine in 15 parts by volume of tetrahydrofurane and then 2.02 parts of triethylamine is added dropwise, while cooling, to a solution of 2.53 parts of di-n-butyl-malonyl dichloride in 50 parts by volume of tetrahydrofurane, after which the mixture is boiled under reflux for 4 hours, with stirring. After the mixture has cooled and has been diluted with ether, it is extracted three times with 2-normal aqueous hydrochloric acid.

The hydrochloric aqueous layer is rendered alkaline with concentrated aqueous caustic soda solution, and is then extracted three times with chloroform. The chloroform solution is dried over sodium sulfate and evaporated under reduced pressure, leaving behind an oily crude product. The latter is dissolved in 50 parts by volume of benzene, and the solution is poured onto a column of 90 parts of aluminum oxide. Benzene and benzene-ether mixture (4:1) elute 1-(N-isopropyl-piperidyl-4')-2-methyl-4,4-di-n-butyl-3,5-diketo-pyrazolidine, as an oily substance.

To prepare the corresponding hydrochloride, dry hydrogen chloride is passed into an ethanolic solution of the free base, and, after concentration of the resultant solution, ether is added thereto, whereupon 1-(N-isopropyl-piperidyl-4')-2-methyl-4,4-di-n-butyl-3,5-diketo-pyrazolidine hydrochloride crystallizes out. After recrystallization from ethanol-ether, it melts at 237–240° (with decomposition).

Example 12

6.45 parts of (N-methyl-piperidyl-4)-hydrazine and 9.4 parts of diethyl malonic acid dimethyl ester are added to a solution of 2.3 parts of sodium in 50 parts by volume of methanol. The methanol is then distilled off under atmospheric pressure, and the remaining residue is heated for two hours to 180° under a reflux condenser. The obtained solid reaction mixture is dissolved in 500 parts by volume of ethanol, and the solution is filtered from a small quantity of undissolved matter. Excess solid carbon dioxide is added to the clear filtrate, the precipitated salts filtered off, and the filtrate evaporated to dryness under reduced pressure. There remains a semi-crystalline residue from which, by fractional crystallization from ethanol and acetone, there is isolated pure 1-(N-methyl-piperidyl-4')-4,4-diethyl-3,5-diketo-pyrazolidine; melting point = 186.5–190°.

Example 13

64.5 parts of (N-methyl-piperidyl-4)-hydrazine and 94 parts of dimethyl malonic acid diethyl ester are added to a solution of 23 parts of sodium in 400 parts by volume of ethanol. The ethanol is then distilled off under atmospheric pressure, and the remaining residue is heated for two hours to 180° under a reflux condenser. The obtained solid reaction mixture is dissolved in 3000 parts by volume of ethanol, and the solution is filtered from a small quantity of undissolved matter. Excess solid carbon dioxide is added to the clear filtrate, the precipitated salts filtered off, and the filtrate evaporated to dryness under reduced pressure. There remains behind a semi-crystalline residue from which, by fractional crystallization from methanol and ether, there is isolated pure 1-(N-methyl-piperidyl-4′)-4,4 - dimethyl - 3,5 - diketo-pyrazolidine; melting point=262-266° (with decomposition).

*Example 14*

10 parts of diethyl-malonyl dichloride are added dropwise, in the course of 30 minutes with stirring and while cooling with ice, to 30 parts by volume of hydrazine hydrate, whereupon a colorless precipitate immediately separates out. After stirring the reaction mass for 10 minutes, the precipitate is separated by suction filtration, the precipitate washed with a small quantity of hydrazine hydrate and then thoroughly pressed. The so-obtained diethyl-malonyl-hydrazide is recovered, after recrystallization from absolute ethanol, in the form of platelets which, upon rapid heating to about 140°, melt with evolution of hydrazine. Upon slow heating, they melt at 255-265°.

While stirring and cooling with ice, a solution of 3.45 parts of sodium nitrite in 10 parts by volume of water is added dropwise to a solution of 4.7 parts of diethyl-malonic acid hydrazide in 50 parts by volume of 1-normal aqueous hydrochloric acid. Thereupon 50 parts by volume of ether are added and stirring is continued for another 20 minutes, after which the precipitate which separates out is filtered off. The ether layer is then separated from the filtrate and is washed with aqueous sodium bicarbonate solution and aqueous sodium chloride solution, after which it is dried over sodium sulfate.

A solution of 3.2 parts of N-methyl-piperidyl-4-hydrazine in 25 parts by volume of ether is then added dropwise, with stirring and while cooling with ice, to the dried ether solution. Stirring is continued for 6 hours at room temperature, after which the mixture is allowed to stand for 3 days, and then finally it is heated to boiling under reflux for 4 hours. The supernatant solution is decanted, after which the colorless oily precipitate is distilled in a high vacuum. A large quantity of oil passes over in the range from 140° to 180° bath temperature under a pressure of 0.07 mm. Hg. The oil which passes over at 190–210° bath temperature under the said pressure, crystallizes in part. From methanol-ether, this yields 1-(N-methyl-piperidyl-4′)-4,4-diethyl-3,5-diketo-pyrazolidine which, after a single recrystallization from methanol-ether melts at 190–195°.

*Example 15*

12.90 parts of N-methyl-piperidyl-4-hydrazine and 13.0 parts of dimethyl-malonic acid diamide are introduced into a solution of 4.6 parts of sodium in 100 parts by volume of absolute ethanol. The ethanol is then distilled off under atmospheric pressure, and the remaining residue is heated under reflux to 170° for 5 hours. The reaction mixture is thereupon dissolved in ethanol, filtered, and excess solid carbon dioxide added to the filtrate. The resultant precipitated salts are filtered off, and the filtrate is evaporated to dryness under reduced pressure. Fractional crystallization of the so-obtained residue from methanol-ether yields pure 1-(N-methyl-piperidyl - 4′)-4,4-dimethyl-3,5-diketo-pyrazolidine which melts at 262–266° (decomposition).

*Example 16*

12.90 parts of N-methyl-piperidyl-4-hydrazine and 17.5 parts of diethyl-malonic acid ethylester amide are introduced into a solution of 4.6 parts of sodium in 100 parts by volume of absolute ethanol. The ethanol is then distilled off under atmospheric pressure, and the remaining residue is heated for five hours under a reflux condenser to a temperature of 180°. The reaction mixture is then taken up in ethanol, filtered, and excess of solid carbon dioxide added to the clear filtrate. Precipitated salts are filtered off, and the filtrate is evaporated to dryness under reduced pressure. Fractional crystallization of the remaining residue from ethanol-acetone yields the pure 1-(N-methyl-piperidyl-4′)-4,4-diethyl-3,5-diketo-pyrazolidine which melts at 186.5–190°.

Having thus disclosed the invention, what is claimed is:

1. A member selected from the group consisting of 3,5-diketo-pyrazolidines which correspond to the formula

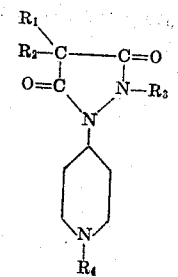

and salts thereof with acids, wherein each of $R_1$ and $R_2$ represents a member selected from the class consisting of aliphatic hydrocarbon radicals with 1 to 4 carbon atoms and phenyl, $R_3$ is a member selected from the group consisting of H and alkyl with 1 to 4 carbon atoms, and $R_4$ is alkyl with 1 to 4 carbon atoms.

2. 1 - (N-methyl-piperidyl-4′)-4,4-diphenyl-3,5-diketo-pyrazolidine.

3. 1 - (N-methyl-piperidyl-4′)-4,4-diethyl - 3,5 - diketo-pyrazolidine.

4. 1 - (N-methyl-piperidyl-4′)-2-isopropyl-4,4-diphenyl-3,5-diketo-pyrazolidine.

5. 1-(N-methyl-piperidyl-4′)-2-isopropyl-4,4-di-n-butyl-3,5-diketo-pyrazolidine.

6. 1 - (N-methyl-piperidyl-4′)-4,4-dimethyl-3,5-diketo-pyrazolidine.

7. A 3,5-diketo-pyrazolidine of the formula

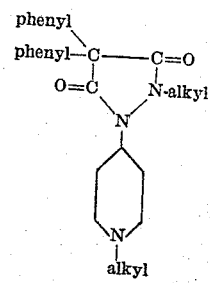

wherein each alkyl group contains 1 to 4 carbon atoms.

8. A 3,5-diketo-pyrazolidine of the formula

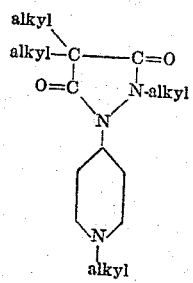

wherein each alkyl group contains 1 to 4 carbon atoms.

9. A 3,5-diketo-pyrazolidine of the formula
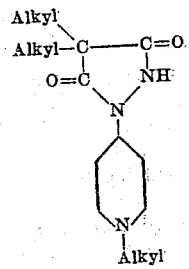
wherein each alkyl group contains 1 to 4 carbon atoms.
10. A 3,5-diketo-pyrazolidine of the formula
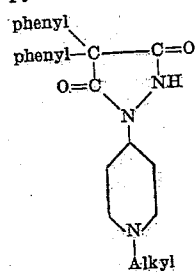
wherein the alkyl group contains 1 to 4 carbon atoms.
No references cited.

UNITED STATES PATENT OFFICE
Certificate of Correction

Patent No. 2,865,922 December 23, 1958

Ernst Jucker et al.

It is hereby certified that error appears in the printed specification of the above numbered patent requiring correction and that the said Letters Patent should read as corrected below.

Column 1, lines 46 to 49, Formula (III) should appear as shown below instead of as in the patent:

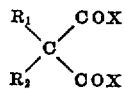

column 2, line 55, for "benxoyl-" read —benzoyl-—.

Signed and sealed this 23rd day of June 1959.

[SEAL]

Attest:
KARL H. AXLINE,
*Attesting Officer.*

ROBERT C. WATSON,
*Commissioner of Patents.*